US011875216B2

(12) United States Patent
Zhu et al.

(10) Patent No.: US 11,875,216 B2
(45) Date of Patent: *Jan. 16, 2024

(54) SYSTEM, DEVICE, PRODUCT, APPARATUS, AND METHOD FOR READING SYRINGE INFORMATION

(71) Applicant: Becton, Dickinson and Company, Franklin Lakes, NJ (US)

(72) Inventors: Hong Zhu, Glen Rock, NJ (US); Gary Ellerbusch, Nutley, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,927

(22) Filed: Dec. 2, 2022

(65) Prior Publication Data

US 2023/0094991 A1 Mar. 30, 2023

Related U.S. Application Data

(63) Continuation of application No. 17/192,568, filed on Mar. 4, 2021, now Pat. No. 11,544,481.

(60) Provisional application No. 62/986,943, filed on Mar. 9, 2020.

(51) Int. Cl.
*G06K 7/10* (2006.01)
(52) U.S. Cl.
CPC ................ *G06K 7/10306* (2013.01)
(58) Field of Classification Search
CPC .......... G06K 7/10306; G06K 7/10089
See application file for complete search history.

(56) References Cited

U.S. PATENT DOCUMENTS

| 6,094,173 | A | 7/2000 | Nylander |
| 7,602,293 | B2 | 10/2009 | Taki et al. |
| 7,667,572 | B2 | 2/2010 | Husak et al. |
| 7,686,789 | B2 * | 3/2010 | Nemoto ............ A61M 5/14546 604/152 |
| 7,873,326 | B2 | 1/2011 | Sadr |
| 8,211,057 | B2 | 7/2012 | Nemoto et al. |

(Continued)

FOREIGN PATENT DOCUMENTS

WO 2016065314 A1 4/2016

OTHER PUBLICATIONS

U.S. Appl. No. 17/159,310.
(Continued)

*Primary Examiner* — Seung H Lee
(74) *Attorney, Agent, or Firm* — The Webb Law Firm

(57) ABSTRACT

A reader includes a first antenna, a second antenna spaced apart from the first antenna, an RFID reader circuit, and a processor. The first antenna and the second antenna are connected to the RFID reader circuit. The first antenna is configured to receive a first signal from an RFID tag. The second antenna is configured to receive a second signal from the RFID tag. The processor controls the RFID reader circuit to determine a first value of a signal parameter associated with the RFID tag based on the first signal and a second value of the signal parameter associated with the RFID tag based on the second signal, receives, from the RFID reader circuit, the first value and the second value, and determines, based on the first value and the second value, whether the RFID tag is located between the first antenna and the second antenna.

20 Claims, 6 Drawing Sheets

(56) References Cited

U.S. PATENT DOCUMENTS

| | | | |
|---|---|---|---|
| 8,689,397 B2 | 4/2014 | Van De Veen et al. | |
| 8,768,248 B2 | 7/2014 | Sadr | |
| 9,367,785 B2 | 6/2016 | Sabesan et al. | |
| 11,544,481 B2 * | 1/2023 | Zhu | G06K 7/10089 |
| 2004/0212542 A1 | 10/2004 | Rahim | |
| 2006/0017634 A1 | 1/2006 | Meissner | |
| 2008/0186177 A1 | 8/2008 | Nikitin et al. | |
| 2008/0191013 A1 | 8/2008 | Liberatore | |
| 2009/0121843 A1 | 5/2009 | Bauchot et al. | |
| 2009/0189767 A1 | 7/2009 | Primm et al. | |
| 2014/0066880 A1 | 3/2014 | Prince et al. | |
| 2014/0184391 A1 | 7/2014 | Elizondo, II | |
| 2014/0225804 A1 | 8/2014 | Wild et al. | |
| 2016/0063287 A1 | 3/2016 | Birrer et al. | |
| 2016/0371515 A1 | 12/2016 | Jung et al. | |
| 2019/0213368 A1 | 7/2019 | White et al. | |

OTHER PUBLICATIONS

U.S. Appl. No. 17/159,320.
U.S. Appl. No. 17/159,348.
U.S. Appl. No. 17/155,297.
U.S. Appl. No. 17/156,758.

* cited by examiner

SYSTEM, DEVICE, PRODUCT, APPARATUS, AND METHOD FOR READING SYRINGE INFORMATION

CROSS-REFERENCE TO RELATED APPLICATIONS

This application is a continuation of U.S. patent application Ser. No. 17/192,568, entitled "System, Device, Product, Apparatus, and Method for Reading Syringe Information", filed Mar. 4, 2021, which claims priority to U.S. Provisional Application Ser. No. 62/986,943, entitled "System, Device, Product, Apparatus, and Method for Reading Syringe Information", filed Mar. 9, 2020, the entire disclosures of each of which are hereby incorporated by reference in their entirety.

BACKGROUND

1. Field

This disclosure relates generally to RFID communications, and in some non-limiting embodiments or aspects, to a system, a device, a product, an apparatus, and/or a method for reading syringe information using RFID communications.

2. Technical Considerations 2D barcode readers may be used to decode 2D barcodes on syringes. 2D bar code readers may use a complex optical system that is manually triggered when a syringe is attached to the 2D bar code reader. This electro-mechanical triggering may not be reliable due to a relatively tight tolerance control associated with mating various components of an injection system for the syringe. In addition, the optical system for a 2D barcode reader may use an expensive barrel lens in a light transmission path, for which factory calibration is relatively difficult and yield rates are relatively low. Accordingly, there is a need for improved reading of syringe information.

SUMMARY

Accordingly, provided are improved systems, devices, products, apparatus, and/or methods for reading syringe information.

According to some non-limiting embodiments or aspects, provided is a reader including a first antenna; a second antenna spaced apart from the first antenna; an RFID reader circuit, the first antenna being connected to the RFID reader circuit, the first antenna being configured to receive a first signal from a first RFID tag, the second antenna being connected to the RFID reader circuit, and the second antenna being configured to receive a second signal from the first RFID tag; and one or more processors programmed and/or configured to: control the RFID reader circuit to determine a first value of a signal parameter associated with the first RFID tag based on the first signal; control the RFID reader circuit to determine a second value of the signal parameter associated with the first RFID tag based on the second signal; receive, from the RFID reader circuit, the first value of the signal parameter associated with the first RFID tag and the second value of the signal parameter associated with the first RFID tag; and determine, based on the first value and the second value, whether the first RFID tag is located between the first antenna and the second antenna.

According to some non-limiting embodiments or aspects, provided is a system and method including: receiving, with a first antenna, a first signal from a first RFID tag; receiving, with a second antenna spaced apart from the first antenna, a second signal from the first RFID tag; determining, with an RFID reader circuit, a first value of a signal parameter associated with the first RFID tag based on the first signal; determining, with the RFID reader circuit, a second value of the signal parameter associated with the first RFID tag based on the second signal; receiving, with at least one processor, the first value of the signal parameter associated with the first RFID tag and the second value of the signal parameter associated with the first RFID tag; and determining, with at least one processor, whether the first RFID tag is located between the first antenna and the second antenna.

According to some non-limiting embodiments or aspects, provided is a system including: a first syringe; a first label including a first RFID tag applied to the first syringe; and a reader including: a first antenna; a second antenna spaced apart from the first antenna; an RFID reader circuit, the first antenna being connected to the RFID reader circuit, the first antenna being configured to receive a first signal from the first RFID tag, the second antenna being connected to the RFID reader circuit, and the second antenna being configured to receive a second signal from the first RFID tag; and one or more processors programmed and/or configured to: control the RFID reader circuit to determine a first value of a signal parameter associated with the first RFID tag based on the first signal; control the RFID reader circuit to determine a second value of the signal parameter associated with the first RFID tag based on the second signal; receive, from the RFID reader circuit, the first value of the signal parameter associated with the first RFID tag and the second value of the signal parameter associated with the first RFID tag; and determine, based on the first value and the second value, whether the first RFID tag is located between the first antenna and the second antenna.

Further non-limiting embodiments or aspects are set forth in the following numbered clauses:

Clause 1. A reader comprising: a first antenna; a second antenna spaced apart from the first antenna; an RFID reader circuit, wherein the first antenna is connected to the RFID reader circuit, wherein the first antenna is configured to receive a first signal from a first RFID tag, wherein the second antenna is connected to the RFID reader circuit, and wherein the second antenna is configured to receive a second signal from the first RFID tag; and one or more processors programmed and/or configured to: control the RFID reader circuit to determine a first value of a signal parameter associated with the first RFID tag based on the first signal; control the RFID reader circuit to determine a second value of the signal parameter associated with the first RFID tag based on the second signal; receive, from the RFID reader circuit, the first value of the signal parameter associated with the first RFID tag and the second value of the signal parameter associated with the first RFID tag; and determine, based on the first value and the second value, whether the first RFID tag is located between the first antenna and the second antenna.

Clause 2. The reader of clause 1, wherein the signal parameter associated with the first RFID tag includes a received signal strength indication (RSSI).

Clause 3. The reader of any of clauses 1 and 2, wherein the first signal and the second signal include ultra-high frequency (UHF) RFID signals.

Clause 4. The reader of any of clauses 1-3, wherein the one or more processors are further programmed and/or configured to: determine a difference between the first value and the second value; and determine that the RFID tag is located between the first antenna and the second antenna in response to the difference satisfying a threshold difference.

Clause 5. The reader of any of clauses 1-4, wherein the RFID reader circuit includes a switching circuit, wherein the first antenna is connected to the switching circuit, wherein the second antenna is connected to the switching circuit, and wherein the switching circuit is configured to selectively couple the first antenna and the second antenna to the RFID reader circuit.

Clause 6. The reader of any of clauses 1-5, wherein the one or more processors are further programmed and/or configured to: control, using the switching circuit, the RFID reader circuit to selectively read the first signal from the first RFID tag with the first antenna and the second signal from the first RFID tag with the second antenna.

Clause 7. The reader of any of clauses 1-6, a connector configured to be connected to a syringe, wherein the connector is located between the first antenna and the second antenna, and wherein the first antenna and the second antenna are located a same distance from the connector.

Clause 8. The reader of any of clauses 1-7, further comprising: a switch configured to be actuated in response to a connection of a first syringe to the connector, wherein the one or more processors are further programmed and/or configured to control the RFID reader circuit to determine the first value and the second value in response to an actuation of the switch.

Clause 9. The reader of any of clauses 1-8, wherein the first RFID tag includes a first label applied to the first syringe.

Clause 10. The reader of any of clauses 1-9, further comprising: at least one third antenna, wherein the at least one third antenna is located the same distance from the connector as the first antenna and the second antenna, wherein the at least one third antenna is configured to receive at least one third signal from the first RFID tag, and wherein the one or more processors are further programmed and/or configured to: control the RFID reader circuit to determine at least one third value of the signal parameter associated with the first RFID tag based on the at least one third signal; receive, from the RFID reader circuit, the at least one third value of the signal parameter associated with the first RFID tag; and determine, based on the first value, the second value, and the at least one third value, whether the first RFID tag is located between the first antenna, the second antenna, and the at least one third antenna.

Clause 11. The reader of any of clauses 1-10, further comprising: an indicator configured to provide an indication associated with information included in at least one of the first signal received from the first RFID tag and the second signal received from the first RFID tag.

Clause 12. The reader of any of clauses 1-11, further comprising: a first shielding material surrounding a portion of the first antenna; and a second shielding material surrounding a portion of the second antenna.

Clause 13. A method comprising: receiving, with a first antenna, a first signal from a first RFID tag; receiving, with a second antenna spaced apart from the first antenna, a second signal from the first RFID tag; determining, with an RFID reader circuit, a first value of a signal parameter associated with the first RFID tag based on the first signal; determining, with the RFID reader circuit, a second value of the signal parameter associated with the first RFID tag based on the second signal; receiving, with at least one processor, the first value of the signal parameter associated with the first RFID tag and the second value of the signal parameter associated with the first RFID tag; and determining, with at least one processor, whether the first RFID tag is located between the first antenna and the second antenna.

Clause 14. The method of clause 13, wherein the signal parameter associated with the first RFID tag includes a received signal strength indication (RSSI).

Clause 15. The method of any of clauses 13 and 14, wherein the first signal and the second signal include ultra-high frequency (UHF) RFID signals.

Clause 16. The method of any of clauses 13-15, further comprising: determining, with at least one processor, a difference between the first value and the second value; and determining, with at least one processor, that the RFID tag is located between the first antenna and the second antenna in response to the difference satisfying a threshold difference.

Clause 17. The method of any of clauses 13-16, further comprising: controlling, with a switching circuit, the RFID reader circuit to selectively read the first signal from the first RFID tag with the first antenna and the second signal from the first RFID tag with the second antenna.

Clause 18. The method of any of clauses 13-17, further comprising: connecting a first syringe to a connector located between the first antenna and the second antenna, wherein the first antenna and the second antenna are located a same distance from the connector, wherein connecting the first syringe to the connector actuates a switch; and controlling, with at least one processor, the RFID reader circuit to determine the first value and the second value in response to the actuation of the switch.

Clause 19. The method of any of clauses 13-18, wherein the first RFID tag includes a first label applied to the first syringe.

Clause 20. The method of any of clause 13-19, further comprising: receiving, with at least one third antenna, at least one third signal from the first RFID tag, wherein the at least one third antenna is located a same distance from the connector as the first antenna and the second antenna; determining, with the RFID reader circuit, at least one third value of the signal parameter associated with the first RFID tag based on the at least one third signal; receiving, with at least one processor, the at least one third value of the signal parameter associated with the first RFID tag; and determining, with at least one processor, based on the first value, the second value, and the at least one third value, whether the first RFID tag is located between the first antenna, the second antenna, and the at least one third antenna.

Clause 21. The method of any of clauses 13-20, further comprising: providing, with an indicator, an indication associated with information included in at least one of the first signal received from the first RFID tag and the second signal received from the first RFID tag.

Clause 22. A system comprising: a first syringe; a first label including a first RFID tag applied to the first syringe; and a reader including: a first antenna; a second antenna spaced apart from the first antenna; an RFID reader circuit, wherein the first antenna is connected to the RFID reader circuit, wherein the first antenna is configured to receive a first signal from the first RFID tag, wherein the second antenna is connected to the RFID reader circuit, and wherein the second antenna is configured to receive a second signal from the first RFID tag; and one or more processors programmed and/or configured to: control the RFID reader circuit to determine a first value of a signal parameter associated with the first RFID tag based on the first signal; control the RFID reader circuit to determine a second value of the signal parameter associated with the first RFID tag based on the second signal; receive, from the RFID reader circuit, the first value of the signal parameter associated with the first RFID tag and the second value of the signal parameter associated with the first RFID tag; and determine, based on the first value and the second value, whether the first RFID tag is located between the first antenna and the second antenna.

Clause 23. The system of clause 22, further comprising: a flow sensor system including a disposable flow sensor and a reusable base, wherein the reusable base includes the reader.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DETAILED DESCRIPTION

Figure 1:
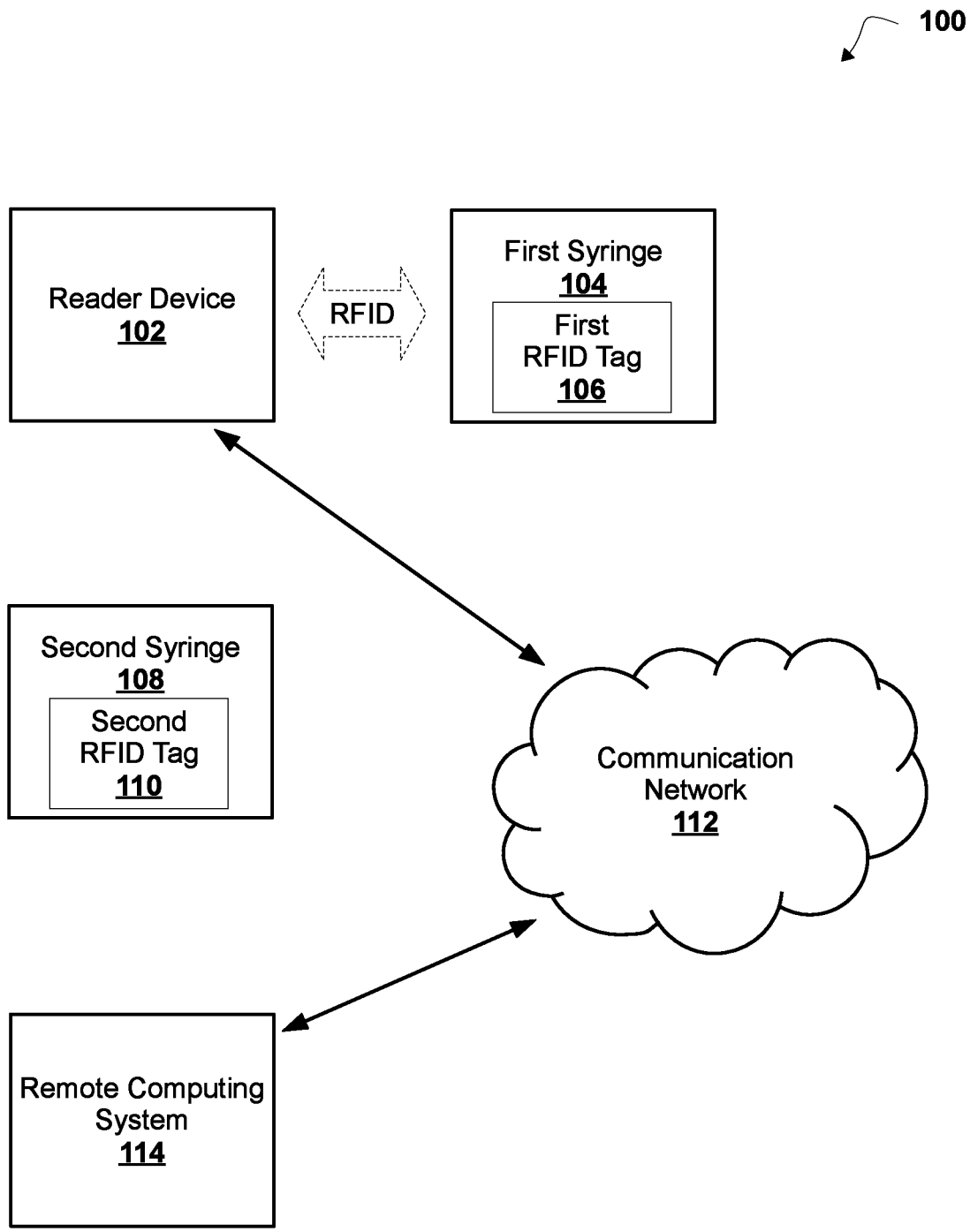
FIG. 1 is a diagram of non-limiting embodiments or aspects of an environment in which systems, devices, products, apparatus, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

For purposes of the description hereinafter, the terms "end," "upper," "lower," "right," "left," "vertical," "horizontal," "top," "bottom," "lateral," "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects of the embodiments or aspects disclosed herein are not to be considered as limiting unless otherwise indicated.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Provided are improved systems, devices, products, apparatus, and/or methods for reading syringe information.

Radio-frequency identification (RFID) uses electromagnetic fields to automatically identify and track tags attached to objects. An RFID system typically includes an RFID reader and a plurality of RFID tags. The RFID reader communicates wirelessly with the RFID tags. The RFID tags may be passive tags, which have no power source and are powered by energy received wirelessly from the RFID reader, or active tags, which are powered by a local or internal power source (e.g., a battery, etc.). The RFID tags include an antenna and a device to electronically store information and/or data to be read from the RFID tags by the RFID reader (e.g., a memory chip, etc.).

RFID typically operates in three main frequency ranges: Low Frequency (LF) (e.g., about 120-150 KHz), High Frequency (HF) (e.g., about 13.56 MHz), and Ultra-High Frequency (UHF) (e.g., about 865-868 MHz in Europe and 902-928 MHz in the U.S.). The LF and HF frequency ranges use magnetically coupled systems where the fields of the RFID reader antenna and the fields of the RFID tag must line up for the RFID reader to read the RFID tag. The LF and HF frequency ranges work well if the orientation of the RFID tags with respect to the reader can be controlled. In contrast, in the UHF frequency range, the RFID tags may still be read if the field orientation of the RFID tags is not directly lined up with the RFID reader antenna. Accordingly, UHF RFID tags may perform better in situations in which the orientation of the RFID tags with respect to the RFID reader cannot be easily controlled and/or known.

An area in which UHF RFID tags can be read by an RFID reader may be controlled by changing a transmit power and/or receive signal gain of the system to make the area smaller or larger. However, UHF RFID has no mechanism for selecting a specific or single tag in a particular location. For example, a UHF RFID reader for reading syringe information from RFID tags on syringes may not be able to identify or differentiate a syringe intended to be scanned and/or being connected to an injection system from other syringes in a surrounding area.

Non-limiting embodiments or aspects of the present disclosure are directed to a system, a reader, and a method therefor including a first antenna, a second antenna spaced apart from the first antenna, an RFID reader circuit, and a processor. The first antenna and the second antenna are connected to the RFID reader circuit. The first antenna is configured to receive a first signal from an RFID tag. The second antenna is configured to receive a second signal from the RFID tag. The processor controls the RFID reader circuit to determine a first value of a signal parameter associated with the RFID tag based on the first signal and a second value of the signal parameter associated with the RFID tag based on the second signal, receives, from the RFID reader circuit, the first value and the second value, and determines, based on the first value and the second value, whether the RFID tag is located between the first antenna and the second antenna. In this way, a syringe including the RFID tag that is intended to be scanned and/or being connected to an injection system can be identified or differentiated from other syringes in a surrounding area that are not intended to be scanned and/or are not being connected to an injection system.

Referring now to FIG. 1, FIG. 1 is a diagram of an example environment 100 in which systems, devices, products, apparatus, and/or methods described herein, may be implemented. As shown in FIG. 1, environment 100 includes reader device 102, first syringe 104, first RFID tag 106, at least one second syringe 108, at least one second RFID tag 110, communication network 112, and/or remote computing system 114. Systems and/or devices of environment 100 can interconnect via wired connections, wireless connections, or a combination of wired and wireless connections.

Reader device 102 includes one or more devices capable of receiving information and/or data from first RFID tag 106, at least one second RFID tag 110, and/or remote computing system 114 (e.g., via communication network 112, etc.) and/or communicating information and/or data to first RFID tag 106, at least one second RFID tag 110, and/or remote computing system 114 (e.g., via communication network 112, etc.). For example, reader device 102 may include one or more computing systems including one or more processors (e.g., one or more computing devices, one or more mobile computing devices, etc.). In some non-limiting embodiments or aspects, reader device 102 is capable of receiving information (e.g., from first RFID tag 106, from at least one second RFID tag 110, etc.) via a RFID communication connection (e.g., via a UHF RFID communication connection, etc.), and/or communicating information (e.g., to first RFID tag 106, to at least one second RFID tag 110, etc.) via a RFID communication connection. In some non-limiting embodiments or aspects, reader device 102 includes a reusable base of a BD Intelliport™ flow sensor and base system included as part of the BD Intelliport™ Medication Management System. Further details regarding non-limiting embodiments or aspects of reader device 102 are provided below with regard to FIGS. 2A-2C.

First RFID tag 106 may be attached to (e.g., removably attached to, integrally formed with, etc.) first syringe 104. For example, first RFID tag 106 may include a first label applied to first syringe 104. As an example, first RFID tag 106 may be attached to a body of first syringe 104.

The at least one second RFID tag 110 may be attached to (e.g., removably attached to, integrally formed with, etc.) the at least one second syringe 108. For example, the at least one second RFID tag 110 may include a second label applied to the at least one second syringe 108. For example, the at least one second RFID tag 110 may be attached to a body of the at least one second syringe 108.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or any combination of these or other types of networks.

Remote computing system 114 may include one or more devices capable of receiving information and/or data from reader device 102 (e.g., via communication network 112, etc.) and/or communicating information and/or data to reader device 102 (e.g., via communication network 112, etc.). For example, remote computing system 114 may include one or more computing systems including one or more processors (e.g., one or more computing devices, one or more mobile computing devices, one or more servers, etc.). In some non-limiting embodiments or aspects, remote computing system 114 includes a nurse station in a hospital. In some non-limiting embodiments or aspects, remote computing system 114 includes a secure hospital server and/or one or more secure hospital databases that store personally identifiable information (PII) and/or Health Insurance Portability and Accountability Act (HIPAA) protected information.

Figure 2A:
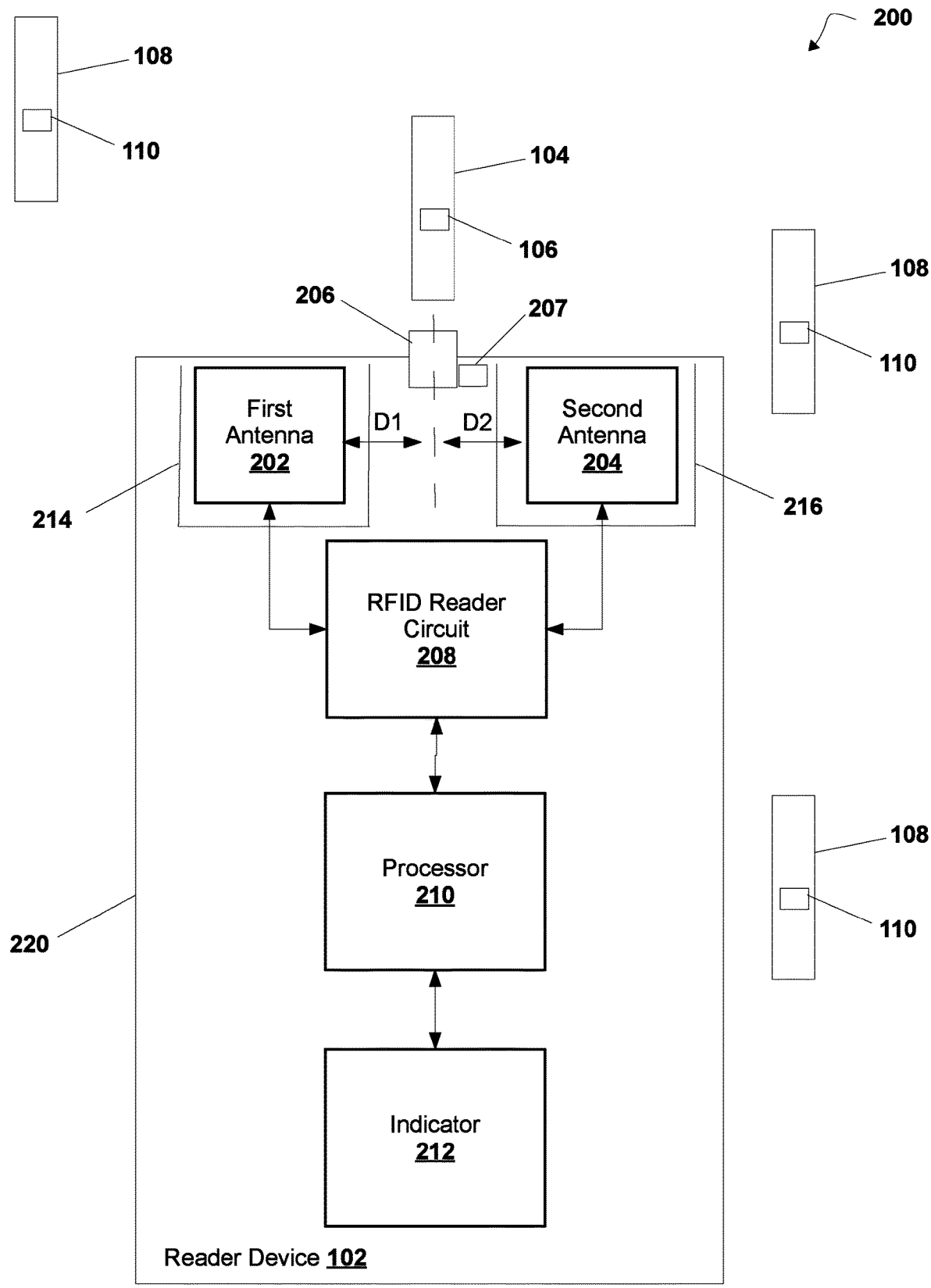
FIGS. 2A and 2B are diagrams of non-limiting embodiments or aspects of an implementation of one or more systems and/or one or more devices of FIG. 1.
Figure 2B:
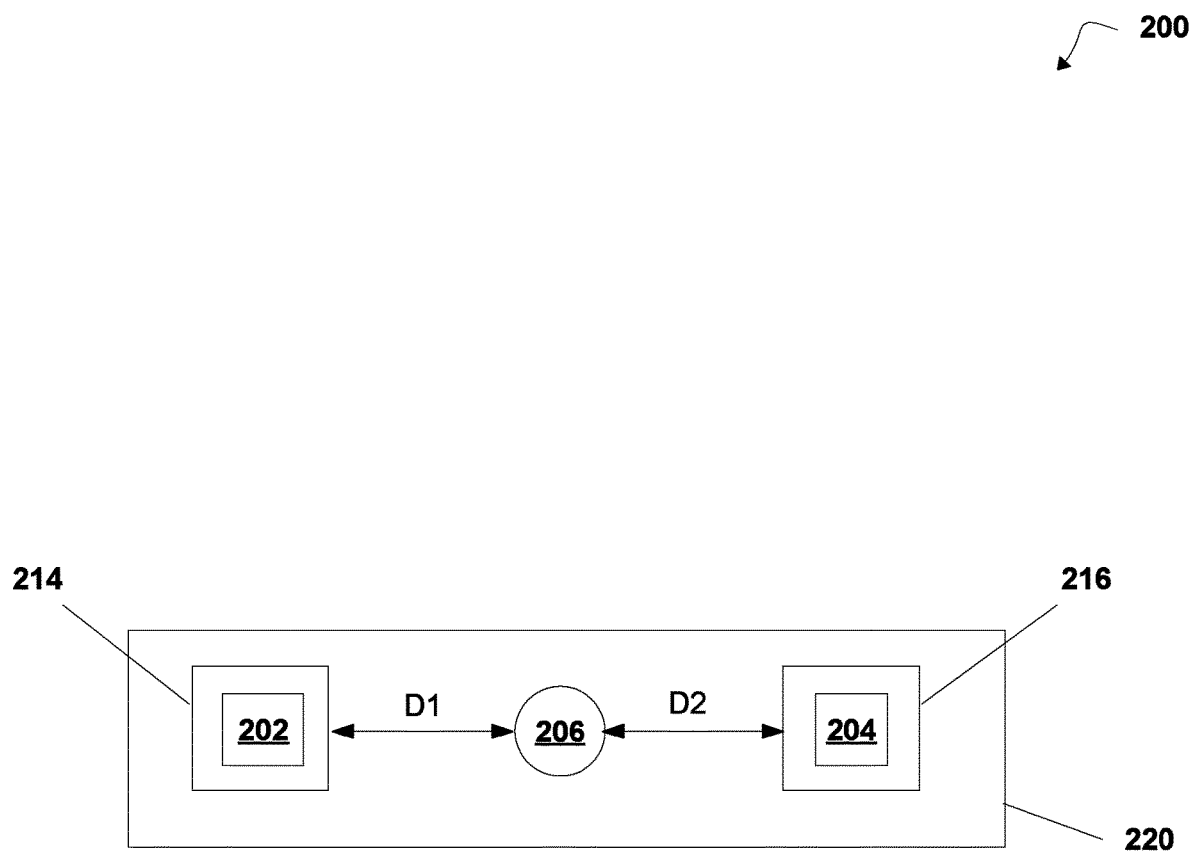

Referring now to FIGS. 2A and 2B, FIGS. 2A and 2B are diagrams of non-limiting embodiments or aspects of an implementation 200 of one or more systems and/or one or more devices of FIG. 1. As shown in FIGS. 2A and 2B, reader device 102 may include first antenna 202, second antenna 204 spaced apart from first antenna 202, connector 206, switch 207, RFID reader circuit 208, processor 210 (e.g., a microcontroller, etc.), indicator 212 (e.g., a display, one or more LED lights, a speaker, etc.), first antenna shielding material 214, and/or second antenna shielding material 216. In some non-limiting embodiments or aspects, reader device 102 may include a housing 220 that houses first antenna 202, second antenna 204, connector 206, switch 207, RFID reader circuit 208, processor 210, indicator 212, first antenna shielding material 214, and/or second antenna shielding material 216.

First antenna 202 and second antenna 204 may be connected to RFID reader circuit 208. First antenna 202 may be configured to receive a first signal from an RFID tag (e.g., first RFID tag 106, at least one second RFID tag 110, etc.). Second antenna 204 may be configured to receive a second signal (e.g., a second signal different than the first signal received by first antenna 202, etc.) from an RFID tag (e.g., first RFID tag 106, at least one second RFID tag 110, the same RFID tag from which first antenna 202 received the first signal, etc.).

Connector 206 may be configured to connect to a syringe (e.g., first syringe 104, at least one second syringe 108, etc.). Connector 206 may be located between first antenna 202 and second antenna 204. First antenna 202 and the second antenna 204 may be located a same distance from connector 206 (e.g., a same distance from a longitudinal axis of connector 206, etc.). For example, as shown in FIGS. 2A and 2B, a distance D1 between first antenna 202 and a center or longitudinal axis of connector 206 may be equal to a distance D2 between second antenna 205 and a center or longitudinal axis of connector 206.

RFID reader circuit 208 may be configured to determine a value of a signal parameter (e.g., a received signal strength indication (RSSI), etc.) associated with an RFID tag based on a signal (e.g., a UHF RFID signal, etc.) received from that RFID tag. For example, RFID reader circuit 208 (e.g., under control of processor 210, etc.) may determine a first value of a signal parameter associated with the RFID tag based on the first signal received by first antenna 202 and determine a second value of the signal parameter associated with the RFID tag based on the second signal received by second antenna 204. As an example, RFID reader circuit 208 (e.g., under control of processor 210, etc.) may determine an RSSI value of the first signal received by first antenna 202 and determine an RSSI value of the second signal received by second antenna 204.

Switch 207 may be configured to be actuated in response to a connection of a syringe (e.g., first syringe 104, etc.) to connector 206. For example, processor 210 may be in electrical communication with switch 207, and processor 210 may be programmed and/or configured to control RFID reader circuit 208 to determine the first value and the second value in response to an actuation of switch 207.

In some non-limiting embodiments or aspects, RFID reader circuit 208 includes a switching circuit (e.g., an RFID switch, a multiplexer, etc.). For example, RFID reader circuit 208 may include a ST25RU3993 module. As an example, first antenna 202 and second antenna 204 may be connected to the switching circuit, and the switching circuit may be configured to selectively couple first antenna 202 and second antenna 204 to RFID reader circuit 208. In such an example, processor 210 may control, using the switching circuit, RFID reader circuit 208 to selectively read a first signal from an RFID tag with first antenna 202 and a second signal from that same RFID tag with second antenna 204. The first signal from the RFID tag received with first antenna 202 and the second signal from that same RFID tag received with second antenna 204 may each include a unique identifier associated with the RFID tag, and RFID reader circuit 208 (and/or processor 210) may distinguish first and second signals from the same RFID tag (e.g., from first RFID tag 106, etc.) from first and/or second signals received with first antenna 202 and/or second antenna 204 from one or more other RFID tags (e.g., the at least one second RFID tag 110 on the at least one second syringe 108, etc.) based on the unique identifiers included in the received signals. However, non-limiting embodiments or aspects are not limited thereto, and RFID reader circuit 208 may include separate RFID reader modules (e.g., separate ST25RU3993 modules, etc.) for each of first antenna 202 and second antenna 204 to respectively read the first signal from the RFID tag with first antenna 202 and the second signal from that same RFID tag with second antenna 204.

Processor 210 may be connected to (e.g., in electrical communication with, etc.) RFID reader circuit 208. Processor 210 may receive, from RFID reader circuit 208, a first value of a signal parameter associated with an RFID tag and a second value of the signal parameter associated with that same RFID tag, and determine, based on the first value and the second value, whether the RFID tag is located between the first antenna and the second antenna (e.g., whether a syringe including the RFID tag is connected to connector 206, etc.). For example, processor 210 may determine whether the first value and the second value (e.g., the RSSI value of the first signal received by first antenna 202 and the RSSI value of the second signal received by second antenna 204, etc.) are substantially equal to each other (e.g., within a tolerance threshold, etc.). As an example, processor 210 may determine a difference between the first value and the second value and, in response to the determined difference satisfying a threshold difference, determine that the RFID tag associated with the same unique identifier included in those corresponding first and second signals is located between the first antenna and the second antenna (e.g., that a syringe including the RFID tag is connected to connector 206, etc.). In such an example, a syringe including the RFID tag that is connected to connector 206 may have substantially equal RSSI values for the first signal and the second signal. As an example, processor 210 may determine a difference between the first value and the second value and, in response to the difference failing to satisfy the threshold difference, determine that the RFID tag is not located between the first antenna and the second antenna (e.g., that the RFID tag is located outside the first antenna and the second antenna, that a syringe including the RFID tag is not connected to connector 206, etc.). In such an example, a syringe including the RFID tag that is not connected to connector 206 may have substantially different RSSI values (e.g., outside a tolerance threshold, etc.) for the first signal and the second signal.

Indicator 212 may be configured to provide an indication associated with information included in and/or associated with a signal received from an RFID tag (e.g., information included in a first signal received from an RFID tag with first antenna 202, information included in a second signal received that same RFID tag with second antenna 204, etc.). In some non-limiting embodiments or aspects, an indication may include at least one of the following: a unique identifier associated with the RFID tag, an indication that a syringe associated with the RFID tag is connected to connector 206, an indication that the syringe associated with the RFID tag is not connected to connector 206, information associated with a medication contained in the syringe associated with the RFID tag, or any combination thereof. In some non-limiting embodiments or aspects, reader device 102 may communicate the indication and/or the information associated therewith to remote computing system 114.

First shielding material 214 may surround a portion of first antenna 202. For example, first shielding material 214 may be configured such that first antenna 202 forms a directive beamforming antenna (e.g., in a 2-dimensional direction toward a top of FIG. 2A, etc.). Second shielding material 216 may surround a portion of second antenna 204. For example, second shielding material 216 may be configured such that second antenna 204 forms a directive beamforming antenna (e.g., in a direction toward a top of FIG. 2A, etc.).

Figure 2C:
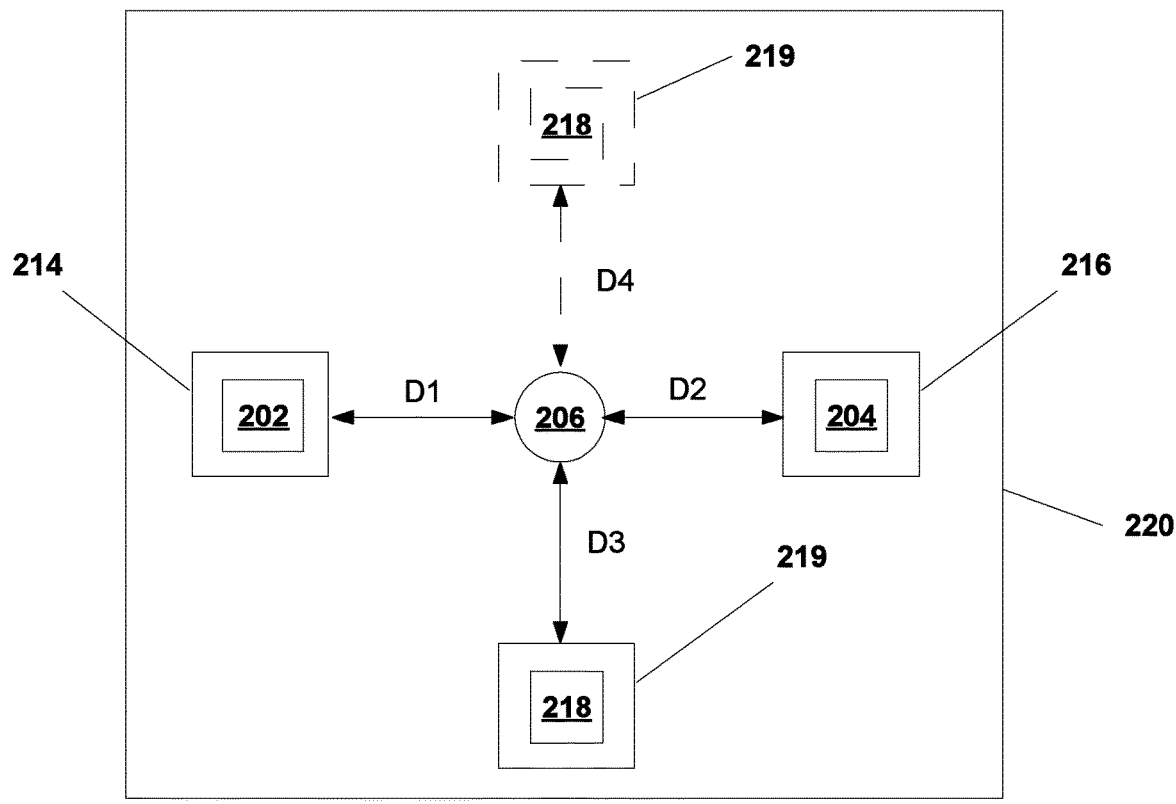
FIG. 2C is a diagram of non-limiting embodiments or aspects of an implementation of one or more systems and/or one or more devices of FIG. 1.

Referring now to FIG. 2C, FIG. 2C is a diagram of non-limiting embodiments or aspects of an implementation 250 of one or more systems and/or one or more devices of FIG. 1. A structure and function of first antenna 202, second antenna 204 spaced apart from first antenna 202, connector 206, switch 207, RFID reader circuit 208, processor 210 (e.g., a microcontroller, etc.), indicator 212 (e.g., a display, one or more LED lights, a speaker, etc.), first antenna shielding material 214, and/or second antenna shielding material 216 may be the same as or similar to that described with respect to FIGS. 2A and 2B and, therefore, a further description thereof is omitted in the interest of brevity.

As shown in FIG. 2C, reader device 102 may further include at least one third antenna 218 and at least one third shielding material 219. The at least one third antenna 218 may be located the same distance from connector 206 as first antenna 202 and second antenna 204. For example, as shown in FIG. 2C, a distance D1 between first antenna 202 and a center or longitudinal axis of connector 206, a distance D2 between second antenna 205 and the center or longitudinal axis of connector 206, and a distance D3 (and/or D4) between at least one third antenna 218 the center or longitudinal axis of connector 206 may be a same distance.

The at least one third antenna 218 may be configured to receive at least one third signal (e.g., at least one third signal different than the first signal received by first antenna 202 and the second signal received by second antenna 204, etc.) from an RFID tag (e.g., first RFID tag 106, at least one second RFID tag 110, the same RFID tag from which first antenna 202 received the first signal and from which second antenna 204 received the second signal, etc.). For example, RFID reader circuit 208 (e.g., under control of processor 210, etc.) may determine at least one third value of the signal parameter associated with the RFID tag based on the at least one third signal received by the at least one third antenna 218. As an example, RFID reader circuit 208 (e.g., under control of processor 210, etc.) may determine an RSSI value of the first signal received by first antenna 202, determine an RSSI value of the second signal received by second antenna 204, and determine an RSSI value of the at least one third signal received by the at least one third antenna 218.

Processor 210 may receive, from the RFID reader circuit 208, the at least one third value of the signal parameter associated with the RFID tag and determine, based on the first value, the second value, and the at least one third value, whether the RFID tag is located between the first antenna, the second antenna, and the at least one third antenna (e.g., whether a syringe including the RFID tag is connected to connector 206, etc.). For example, processor 210 may determine whether the first value, the second value, and the third value (e.g., the RSSI value of the first signal received by first antenna 202, the RSSI value of the second signal received by second antenna 204, and the RSSI value of the at least one third signal received by the at least one third antenna 218, etc.) are substantially equal to each other (e.g., within a tolerance threshold, etc.). As an example, processor 210 may determine one or more differences between the first value, the second value, and the third value and, in response to the determined difference(s) satisfying one or more threshold differences, determine that the RFID tag associated with the same unique identifier included in those corresponding first, second, and third signals is located between the first antenna, the second antenna, and the at least one third antenna (e.g., that a syringe including the RFID tag is connected to connector 206, etc.).

The number and arrangement of systems and devices shown in FIGS. 1 and 2A-2C are provided as an example. There can be additional systems and/or devices, fewer systems and/or devices, different systems and/or devices, or differently arranged systems and/or devices than those shown in FIGS. 1 and 2A-2C. Furthermore, two or more systems or devices shown in FIGS. 1 and 2A-C can be implemented within a single system or a single device, or a single system or a single device shown in FIGS. 1 and 2A-2C can be implemented as multiple, distributed systems or devices. Additionally, or alternatively, a set of systems or a set of devices (e.g., one or more systems, one or more devices, etc.) of environment 100, implementation 200, and/or implementation 250 can perform one or more functions described as being performed by another set of systems or another set of devices of environment 100, implementation 200, and/or implementation 250.

Figure 3:
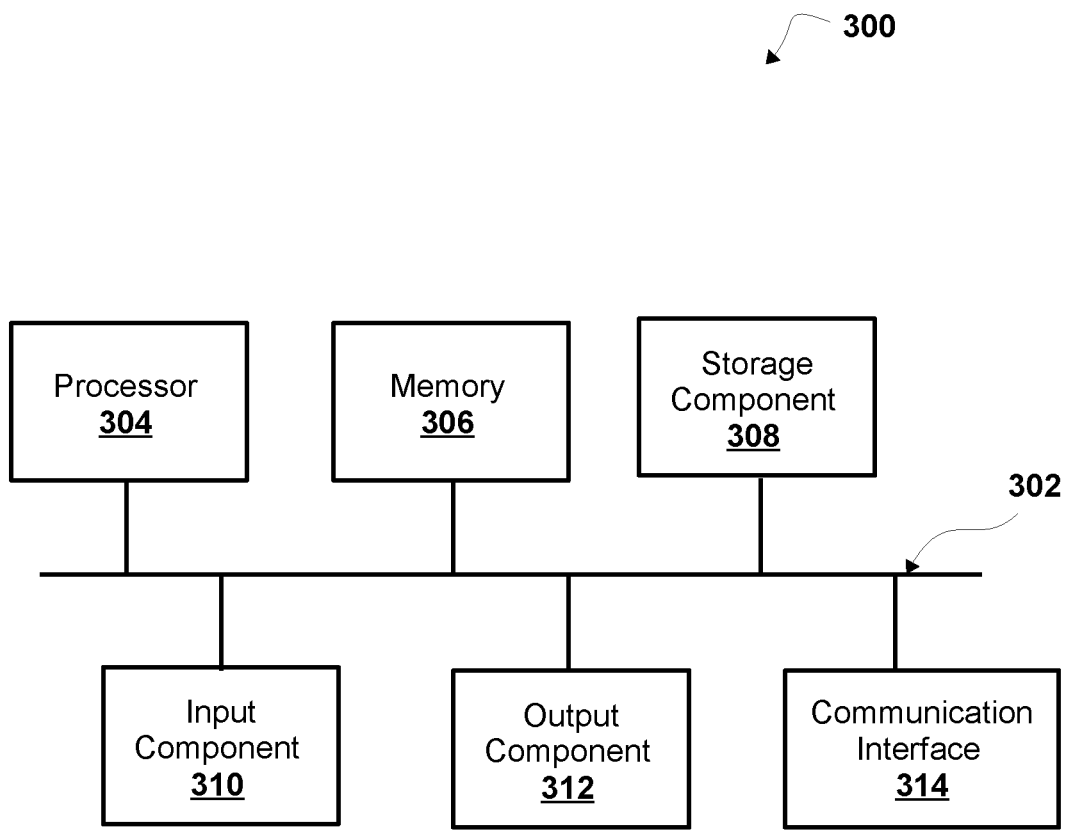
FIG. 3 is a diagram of non-limiting embodiments or aspects of components of one or more devices and/or one or more systems of FIGS. 1 and 2A-2C.

Referring now to FIG. 3, FIG. 3 is a diagram of example components of a device 300. Device 300 may correspond to one or more devices of reader device 102 and/or one or more devices of remote computing system 114. In some non-limiting embodiments or aspects, one or more devices of reader device 102 and/or one or more devices of remote computing system 114 can include at least one device 300 and/or at least one component of device 300. As shown in FIG. 3, device 300 may include a bus 302, a processor 304, memory 306, a storage component 308, an input component 310, an output component 312, and a communication interface 314.

Bus 302 may include a component that permits communication among the components of device 300. In some non-limiting embodiments or aspects, processor 304 may be implemented in hardware, firmware, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), a microcontroller (MCU), etc.) that can be programmed to perform a function. Memory 306 may include random access memory (RAM), read only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, a camera, an electroencephalogram (EEG) monitor, patient monitoring system etc.). Additionally, or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), and/or the like).

Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. For example, the information may input data, output data, medical data, or any combination thereof.

The number and arrangement of components shown in FIG. 3 are provided as an example. In some non-limiting embodiments or aspects, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
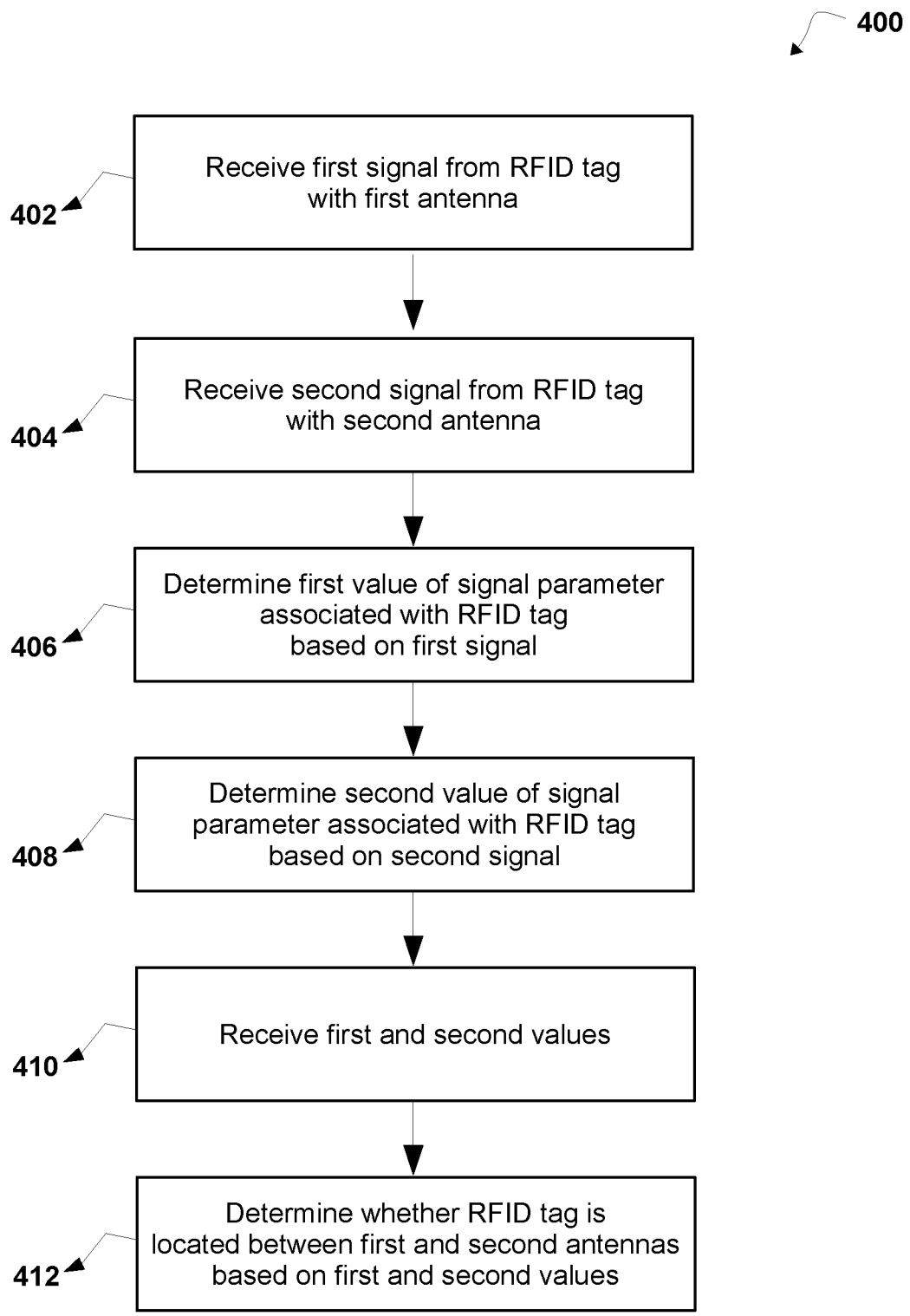
FIG. 4 is a flowchart of non-limiting embodiments or aspects of a process for reading syringe information.

Referring now to FIG. 4, FIG. 4 is a flowchart of a non-limiting embodiment or aspect of a process 400 for reading syringe information. In some non-limiting embodiments or aspects, one or more of the steps of process 400 are performed (e.g., completely, partially, etc.) by reader device 102 (e.g., one or more devices of a system of reader device 102, etc.). In some non-limiting embodiments or aspects, one or more of the steps of process 400 are performed (e.g., completely, partially, etc.) by another device or a group of devices separate from or including reader device 102, such as remote computing system 114 (e.g., one or more devices of remote computing system 114, etc).

As shown in FIG. 4, at step 402, process 400 includes receiving, with reader device 102 (e.g., with first antenna 202, etc.), a first signal (e.g., a UHF RFID signal, etc.) from first RFID tag 106.

As shown in FIG. 4, at step 404, process 400 includes receiving, with reader device 102 (e.g., with second antenna 204 spaced apart from the first antenna 202, etc.), a second signal (e.g., a UHF RFID signal, etc.) from first RFID tag 106.

In some non-limiting embodiments or aspects, reader device 102 receives (e.g., with at least one third antenna 218 located a same distance from connector 206 as first antenna 202 and second antenna 204, etc.) at least one third signal from first RFID tag 106.

As shown in FIG. 4, at step 406, process 400 includes determining, with reader device 102 (e.g., with RFID reader circuit 208, etc.), a first value of a signal parameter associated with first RFID tag 106 (e.g., an RSSI value of the first signal, etc.) based on the first signal.

As shown in FIG. 4, at step 408, process 400 includes determining, with reader device 102 (e.g., with RFID reader circuit 208, etc.), a second value of the signal parameter associated with first RFID tag 106 (e.g., an RSSI value of the second signal, etc.) based on the second signal.

In some non-limiting embodiments or aspects, reader device 102 determines (e.g., with RFID reader circuit 208, etc.) at least one third value of the signal parameter associated with first RFID tag 106 (e.g., an RSSI value of the at least one third signal, etc.) based on the at least one third signal In some non-limiting embodiments or aspects, reader device 102 selectively reads the first signal from first RFID tag 106 with first antenna 202 and the second signal from first RFID tag 106 with second antenna 204 (and/or the at least one third signal from first RFID tag 106 with the at least one third antenna 218).

In some non-limiting embodiments or aspects, connecting first syringe 104 (e.g., first syringe 104 including first RFID tag 106 applied as a label to first syringe 104, etc.) to connector 206 located between first antenna 202 and second antenna 204, wherein the first antenna and the second antenna are located a same distance from the connector, actuates switch 207 and, in response to actuation of switch 207, reader device 102 determines the first value and the second value.

As shown in FIG. 4, at step 410, process 400 includes receiving, with reader device 102 (e.g., with processor 210, etc.), the first value of the signal parameter associated with first RFID tag 106 and the second value of the signal parameter associated with first RFID tag 106.

In some non-limiting embodiments or aspects, reader device 102 receives the at least one third value of the signal parameter associated with first RFID tag 106.

As shown in FIG. 4, at step 412, process 400 includes determining, with reader device 102 (e.g., with processor 210, etc.), whether first RFID tag 106 is located between first antenna 202 and second antenna 204 (e.g., whether first syringe 104 including first RFID tag 106 is connected to connector 206, etc.).

In some non-limiting embodiments or aspects, reader devices determines, based on the first value, the second value, and the at least one third value, whether first RFID tag 106 is located between first antenna 202, second antenna 204, and the at least one third antenna 218 (e.g., whether first syringe 104 including first RFID tag 106 is connected to connector 206, etc.).

In some non-limiting embodiments or aspects, reader device 102 determines a difference between the first value and the second value and, in response to the difference satisfying a threshold value, determines that first RFID tag 106 is located between first antenna 202 and the second antenna 204 (e.g., that first syringe 104 including first RFID tag 106 is connected to connector 106, etc.).

In some non-limiting embodiments or aspects, reader device 102 provides an indication (e.g., via indicator 212, etc.) associated with information included in at least one of the first signal received from first RFID tag 106 and the second signal received from first RFID tag 106.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A reader comprising:
   a plurality of antennas configured to receive a plurality of signals from an RFID tag on a syringe, wherein the plurality of antennas is spaced apart from each other;
   an RFID reader circuit, wherein the plurality of antennas is connected to the RFID reader circuit, and wherein the RFID reader circuit is configured to determine a plurality of values of a signal parameter associated with the RFID tag based on the plurality of signals;
   a connector configured to be connected to the syringe, wherein the connector is located between the plurality of antennas; and
   one or more processors programmed and/or configured to:
      receive, from the RFID reader circuit, the plurality of values of the signal parameter associated with the RFID tag; and
      determine, based on the plurality of values of the signal parameter associated with the RFID tag, whether the syringe including the RFID tag is connected to the connector.

2. The reader of claim 1, wherein the signal parameter associated with the RFID tag includes a received signal strength indication (RSSI).

3. The reader of claim 1, wherein the plurality of signals includes ultra-high frequency (UHF) RFID signals.

4. The reader of claim 1, wherein the one or more processors are further programmed and/or configured to:
   determine a difference between the plurality of values of the signal parameter associated with the RFID tag; and
   determine that the syringe including the RFID tag is connected to the connector in response to the difference satisfying a threshold difference.

5. The reader of claim 1, wherein the RFID reader circuit includes a switching circuit, wherein the plurality of antennas is connected to the switching circuit, and wherein the switching circuit is configured to selectively couple the plurality of antennas to the RFID reader circuit.

6. The reader of claim 5, wherein the one or more processors are further programmed and/or configured to:
   control, using the switching circuit, the RFID reader circuit to selectively read the plurality of signals from the RFID tag with the plurality of antennas.

7. The reader of claim 1, wherein each antenna of the plurality of antennas is located a same distance from the connector.

8. The reader of claim 1, further comprising:
   a switch configured to be actuated in response to a connection of the syringe to the connector, wherein the one or more processors are further programmed and/or configured to control the RFID reader circuit to determine the plurality of values in response to an actuation of the switch.

9. The reader of claim 1, wherein the RFID tag includes a label applied to the syringe.

10. The reader of claim 1, further comprising:
    an indicator configured to provide an indication associated with information included in at least one signal of the plurality of signals received from the RFID tag.

11. The reader of claim 1, further comprising:
a plurality of shielding materials surrounding the plurality of antennas.

12. A method comprising:
receiving, with a plurality of antennas, a plurality of signals from an RFID tag on a syringe, wherein the plurality of antennas are spaced apart from each other, and wherein a connector configured to be connected to the syringe is located between the plurality of antennas;
determining, with an RFID reader circuit, a plurality of values of a signal parameter associated with the RFID tag based on the plurality of signals;
receiving, with at least one processor, the plurality of values of the signal parameter associated with the RFID tag; and
determining, with the at least one processor, based on the plurality of values of the signal parameter associated with the RFID tag, whether the syringe including the RFID tag is connected to the connector.

13. The method of claim 12, wherein the signal parameter associated with the RFID tag includes a received signal strength indication (RSSI).

14. The method of claim 12, wherein the plurality of signals include ultra-high frequency (UHF) RFID signals.

15. The method of claim 12, further comprising:
determining, with at least one processor, a difference between the plurality of values of the signal parameter; and
determining, with at least one processor, that the syringe including the RFID tag is connected to the connector in response to the difference satisfying a threshold difference.

16. The method of claim 12, further comprising:
controlling, with a switching circuit, the RFID reader circuit to selectively read the plurality of signals from the RFID tag with the plurality of antennas.

17. The method of claim 12, wherein each antenna of the plurality of antennas is located a same distance from the connector.

18. The method of claim 12, wherein connecting the syringe to the connector actuates a switch, and wherein the method further comprises:
controlling, with the at least one processor, the RFID reader circuit to determine the plurality of values in response to an actuation of the switch.

19. The method of claim 12, wherein the RFID tag includes a label applied to the syringe.

20. The method of claim 12, further comprising:
providing, with an indicator, an indication associated with information included in at least one signal of the plurality of signals.

* * * * *